(12) United States Patent
Kim et al.

(10) Patent No.: US 11,454,408 B2
(45) Date of Patent: Sep. 27, 2022

(54) AIR CONDITIONER AND METHOD FOR CONTROLLING THE SAME

(71) Applicant: LG Electronics Inc., Seoul (KR)

(72) Inventors: Yongmin Kim, Seoul (KR); Sunyoung Moon, Seoul (KR); Hoojin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 342 days.

(21) Appl. No.: 16/780,474

(22) Filed: Feb. 3, 2020

(65) Prior Publication Data
US 2020/0309395 A1    Oct. 1, 2020

(30) Foreign Application Priority Data
Mar. 28, 2019  (KR) .................. 10-2019-0035649

(51) Int. Cl.
| | |
|---|---|
| B01F 23/20 | (2022.01) |
| F24F 6/02 | (2006.01) |
| F24F 11/00 | (2018.01) |
| B01D 46/00 | (2022.01) |
| C02F 1/32 | (2006.01) |
| C02F 1/00 | (2006.01) |
| F24F 8/10 | (2021.01) |
| B01F 23/213 | (2022.01) |
| F24F 6/00 | (2006.01) |
| F24F 8/22 | (2021.01) |

(52) U.S. Cl.
CPC ...... *F24F 11/0008* (2013.01); *B01D 46/0027* (2013.01); *B01F 23/213* (2022.01); *B01F 23/2133* (2022.01); *C02F 1/001* (2013.01); *C02F 1/325* (2013.01); *F24F 6/02* (2013.01); *F24F 8/10* (2021.01); *B01D 2279/50* (2013.01); *C02F 2201/326* (2013.01); *C02F 2209/42* (2013.01); *C02F 2303/04* (2013.01); *F24F 8/22* (2021.01); *F24F 2006/008* (2013.01)

(58) Field of Classification Search
CPC ........ F24F 6/02; F24F 6/12; F24F 8/10; F24F 13/20; B01F 23/20; B01F 23/2133; B01F 23/213

See application file for complete search history.

(56) References Cited

U.S. PATENT DOCUMENTS

| | | | |
|---|---|---|---|
| 9,534,801 B2 * | 1/2017 | Choi | F24F 6/04 |
| 9,752,789 B2 * | 9/2017 | Staniforth | F24F 6/12 |

FOREIGN PATENT DOCUMENTS

| | | | | |
|---|---|---|---|---|
| CN | 202613636 U | * | 12/2012 | ............ F24F 6/12 |
| KR | 100820149 | | 4/2008 | |

(Continued)

OTHER PUBLICATIONS

PCT International Search Report in International Appln. No. PCT/KR2020/000914, dated Apr. 28, 2020, 3 pages.

*Primary Examiner* — Robert A Hopkins
(74) *Attorney, Agent, or Firm* — Fish & Richardson P.C.

(57) ABSTRACT

An air conditioner includes a humidifying assembly and a control unit to control the humidifying assembly. The humidifying assembly includes a humidifying-receiving unit including a water tank configured to receive water and a humidifying-sterilizing unit configured to irradiate light to sterilize water received in the water tank. The control unit is configured to control a driving time of the humidifying-sterilizing unit based on an amount of water received in the water tank.

20 Claims, 10 Drawing Sheets

(56) References Cited

FOREIGN PATENT DOCUMENTS

| | | |
|---|---|---|
| KR | 20120026910 | 3/2012 |
| KR | 20120081900 | 7/2012 |
| KR | 20150075489 | 7/2015 |
| KR | 20170024837 | 3/2017 |
| KR | 20180038155 | 4/2018 |

* cited by examiner

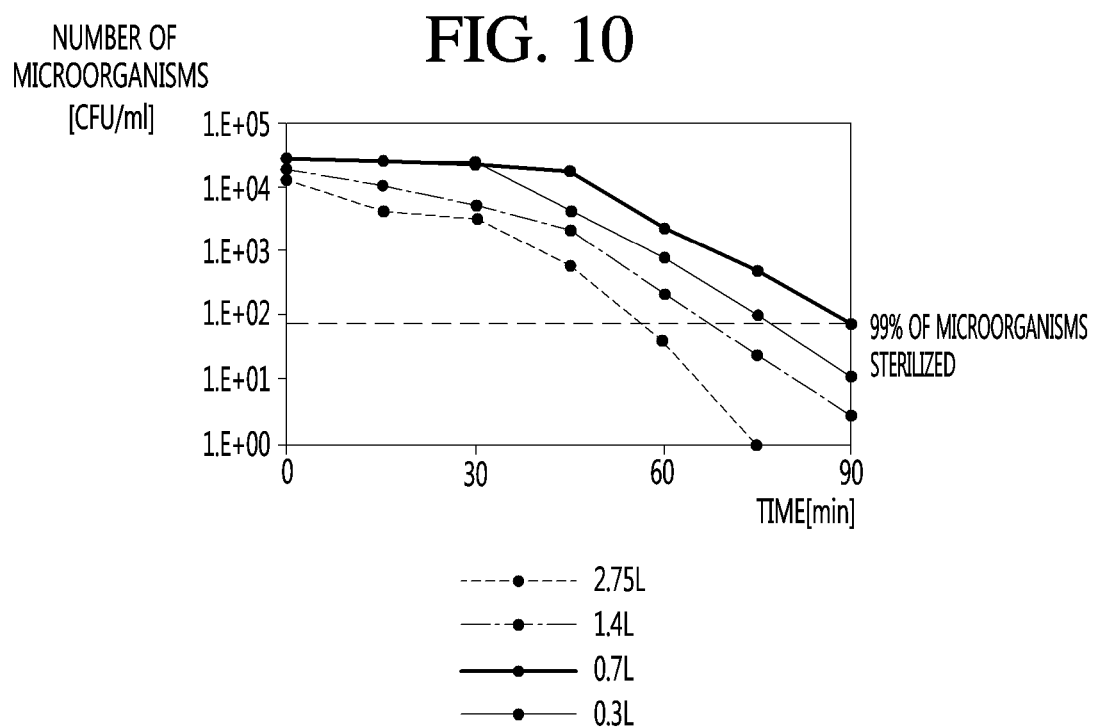

AIR CONDITIONER AND METHOD FOR CONTROLLING THE SAME

CROSS-REFERENCE TO RELATED APPLICATIONS

This application claims priority to Korean Patent Application No. 10-2019-0035649 filed on Mar. 28, 2019, in Korea, the entire contents of which are hereby incorporated by reference in their entirety.

TECHNICAL FIELD

The present application relates to an air conditioner and a method for controlling the same.

BACKGROUND

An air conditioner is a device that may keep air in an installation space in a suitable state according to usage and purposes. For example, the installation space may be an indoor space of a house or a building.

In some examples, the air conditioner may include a compressor, a condenser, an expansion device, and an evaporator that may drive a refrigeration cycle for compressing, condensing, expanding, and evaporating refrigerant. In some cases, the air conditioner may cool or heat a predetermined space. For example, the air conditioner may include a heater and a humidifying assembly to humidify or dehumidify the predetermined space.

In some cases, the humidifying assembly may include a humidifying-sterilizing unit to sterilize a predetermined humidifying medium or water contained in a water tank. In particular, the humidifying-sterilizing unit is provided in the form of a device to irradiate predetermined light to sterilize the water contained in the water tank, thereby preventing germs from being propagating.

In some cases, a sterilizing device may include a water tank for storing purified water and a sterilizing device to sterilize the purified water, and a UV LED is provided in the sterilizing device. In some cases, the purified water may be circulated to extend the lifetime of the UV LED by reducing the operation time of the UV LED.

In some cases, the water level of the purified water is sensed as a low level, the UV LED may be adjusted to be lowered in intensity or to have shorter light emitting time. Further, when the water level of the purified water is sensed as a high level, the UV LED may be adjusted to be increased in intensity or to have longer light emitting time, thereby adjusting the sterilizing performance based on the water level of the purified water.

In some examples, the amount of light necessary for sterilization may be proportional to an amount of water to be sterilized. However, this tendency may depend on the arrangement of the sterilizing device, particularly, the arrangement between the UV LED and the stored water. For instance, when the UV LED is positioned above the purified water, the water level of the purified water may be not proportional to the intensity of the UV LED or the light emitting time.

Effective sterilization may not be performed without considering the arrangement of the device. In some cases, sterilizing purified water by circulating the purified water may require cost and a complex configuration.

SUMMARY

The present disclosure describes an air conditioner configured to control a sterilizing duration based on a remaining amount of water, and a method for controlling the same.

The present disclosure also describes an air conditioner and a method for controlling the same, where the air conditioner may be capable of performing humidifying air by water efficiently sterilized for a minimum sterilizing duration, which may extend a lifespan of a humidifying-sterilizing unit.

The present disclosure also describes an air conditioner configured to be driven in various air conditioning modes to heat, cool, purify, or humidify air and supply conditioned air to an installation space of the air conditioner, and a management mode for effectively managing components, and a method for controlling the same.

According to one aspect of the subject matter described in this application, an air conditioner includes: a case that defines an inlet and an outlet; a fan configured to generate air flow from the inlet to the outlet; a filter assembly disposed inside the case and configured to allow air introduced through the inlet to pass therethrough; and a humidifying assembly disposed inside the case and configured to humidify filtered air to be discharged through the outlet. The humidifying assembly includes: a humidifying-receiving unit including a water tank configured to receive water, a humidifying-producing unit configured to generate water vapor from water supplied from the humidifying-receiving unit, a humidifying-supplying unit configured to receive the water vapor produced from the humidifying-producing unit and supply the water vapor to the outlet, and a humidifying-sterilizing unit configured to irradiate light to water received in the water tank. The air conditioner further includes a control unit configured to control the fan and the humidifying assembly, where the control unit is configured to, based on a remaining amount of water in the water tank, control a driving time of the humidifying-sterilizing unit corresponding to a sterilizing duration for water in the water tank.

Implementations according to this aspect may include one or more of the following features. For example, the control unit may be configured to: based on the remaining amount of water being greater than or equal to a first reference value that is preset, determine the sterilizing duration to be inversely proportional to the remaining amount of water; and based on the remaining amount of water being less than the first reference value, determine the sterilizing duration to be proportional to the remaining amount of water.

In some examples, the first reference value corresponds to an amount of water corresponding to a maximum sterilizing duration. In some examples, the control unit may be configured to: determine the remaining amount of water based on an irradiation distance between the humidifying-sterilizing unit and water in the water tank; and based on the remaining amount of water being greater than or equal to the first reference value, increase the sterilizing duration in response to a decrease of the remaining amount of water.

In some implementations, the control unit may be configured to: based on the remaining amount of water being less than the first reference value, decrease the sterilizing duration in response to a decrease of the remaining amount of water in the water tank. In some examples, the control unit may be configured to stop driving of the humidifying-sterilizing unit based on the remaining amount of water being less than the first reference value and a second reference value that is preset.

In some implementations, the air conditioner may further include a residual water sensor configured to measure the remaining amount of water, where the humidifying-sterilizing unit and the residual water sensor are positioned at an upper portion of the water tank. In some examples, the water tank may define a water inlet at a top surface of the water tank, where the humidifying-receiving unit may be configured to be rotatably installed inside the case and to rotate relative to the case to thereby expose the water inlet to an outside of the case. The humidifying-sterilizing unit and the residual water sensor may be positioned at an upper portion of the water inlet in a state in which the humidifying-receiving unit is installed inside the case.

In some implementations, the case may include: a cabinet; and a door movably coupled to a front surface of the cabinet and configured to move to one side of the cabinet to thereby expose the humidifying-receiving unit to the outside of the case. The humidifying-receiving unit may be configured to, based on the door moving to the one side of the cabinet, rotate from an inside of the cabinet to the front surface of the cabinet to thereby expose the water inlet to the outside of the case.

In some implementations, the control unit may be configured to, based on the remaining amount of water being less than a second reference value that is preset, control the humidifying-receiving unit to rotate relative to the case to thereby expose the water inlet to the outside of the case. In some implementations, the door may be configured to move to another side of the cabinet to thereby cover the humidifying-receiving unit based on the humidifying-receiving unit rotating from the front surface of the cabinet to the inside of the cabinet.

In some implementations, the outlet may include a first outlet defined at a front surface of the case and a second outlet defined at a side surface of the case, and the humidifying-supplying unit may be configured to supply the water vapor to the second outlet. In some examples, the fan may include a first fan configured to blow air to the first outlet and a second fan configured to blow air to the second outlet, and the first fan and the second fan are arranged along a vertical direction in the case.

In some implementations, the control unit may be configured to generate air flow from the inlet to at least one of the first outlet or the second outlet by operating at least one of the first fan or the second fan. In some examples, the control unit may be configured to, based on operating both of the second fan and the humidifying-producing unit, discharge the water vapor produced from the humidifying-producing unit through the second outlet.

In some implementations, the humidifying-receiving unit may include a housing that is detachably installed inside the water tank and a water filter received in the housing. In some examples, the housing may define: a first flowing port that faces an inner surface of the water tank and that may be configured to introduce water in the water tank to the water filter; and a second flowing port that faces a bottom surface of the water tank and that may be configured to discharge water passing through the water filter.

In some implementations, the water tank may define a water outlet that is disposed at the bottom surface of the water tank and that is configured to receive water discharged through the second flowing port. In some examples, the water tank may define a groove recessed from a bottom surface of the water tank, and the housing may include a protrusion that protrudes from a bottom surface of the housing toward the bottom surface of the water tank and that is configured to be accommodated in the groove of the water tank.

In some implementations, the case may include: an upper cabinet that receives the filter assembly and that defines the inlet; a lower cabinet that is disposed vertically below the upper cabinet and that receives the humidifying assembly; and a door disposed forward of the upper cabinet and the lower cabinet and configured to cover front surfaces of the upper cabinet and the lower cabinet.

In some implementations, the control operation of the air conditioner may be performed by changing the sterilizing duration depending on the remaining amount of water, thereby efficiently sterilizing water provided in the humidifying-receiving unit of the humidifying assembly.

In some examples, the sterilizing duration may be reduced to operate the humidifying-sterilizing unit as less as possible, thereby extending the lifespan of the humidifying-sterilizing unit.

In some implementations, as the air conditioner is operated in various air conditioning modes and various management modes, the demand of the user may be variously satisfied.

In some implementations, the temperature, the humidify, and the clarity of the installation space may be adjusted through various air conditioning modes such as the cooling/heating mode, the humidifying mode, and the purifying mode.

In some implementations, the components may be efficiently managed in various management modes such as the cleaning mode, the water supply mode, and the sterilizing mode, thereby increasing the convenience of the user.

BRIEF DESCRIPTION OF THE DRAWINGS

The present disclosure will become more fully understood from the detailed description given herein below and the accompanying drawings, which are given by illustration only, and thus are not limitative of the present disclosure.

FIG. 10 is a graph illustrating an example of the relationship between a remaining amount of water and a sterilizing duration for water in an example air conditioner.

DETAILED DESCRIPTION

Figure 1:
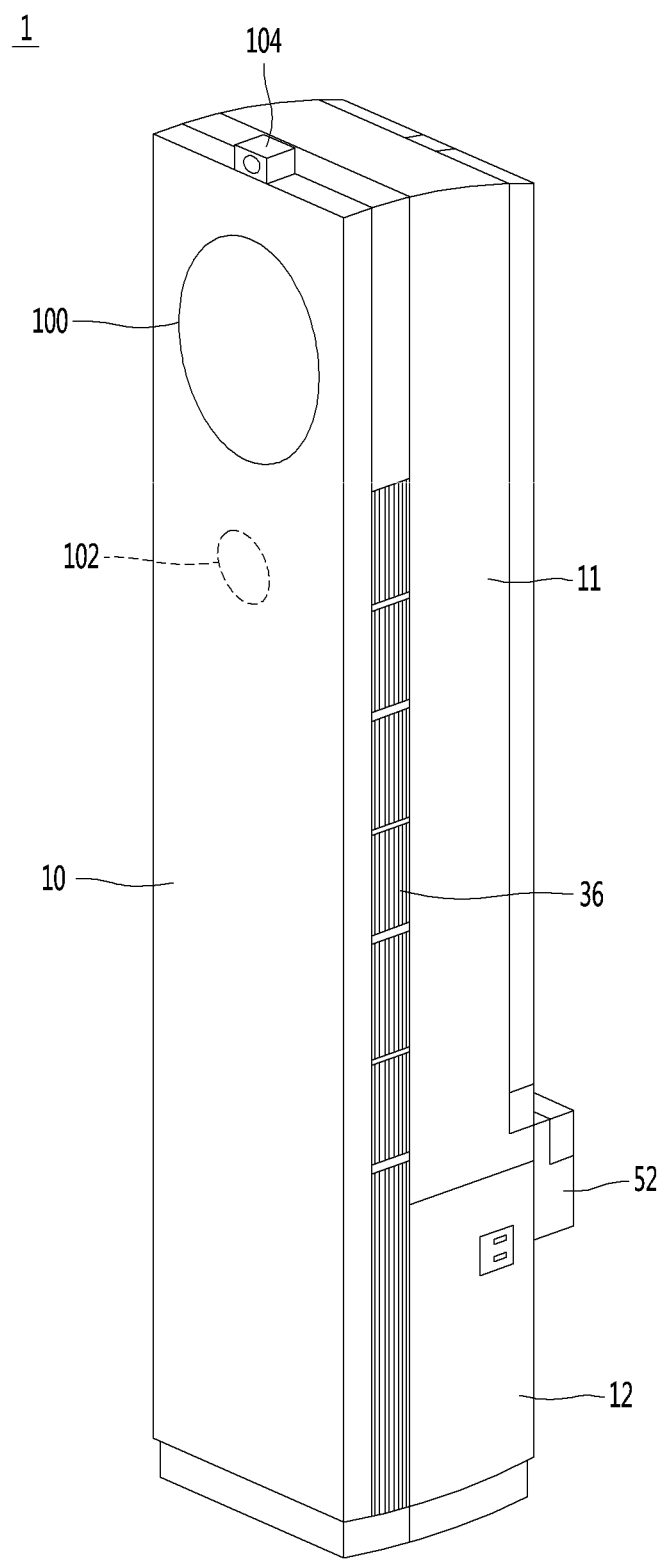
FIG. 1 is a view illustrating an example of an air conditioner.

Hereinafter, one or more implementations of the present disclosure will be described in detail with reference to accompanying drawings. In the following description, the same reference numerals will be assigned to the same components even though the components are illustrated in different drawings. In addition, in the following description of an implementation of the present disclosure, a detailed description of well-known features or functions will be ruled out in order not to unnecessarily obscure the gist of the present disclosure.

Figure 2:
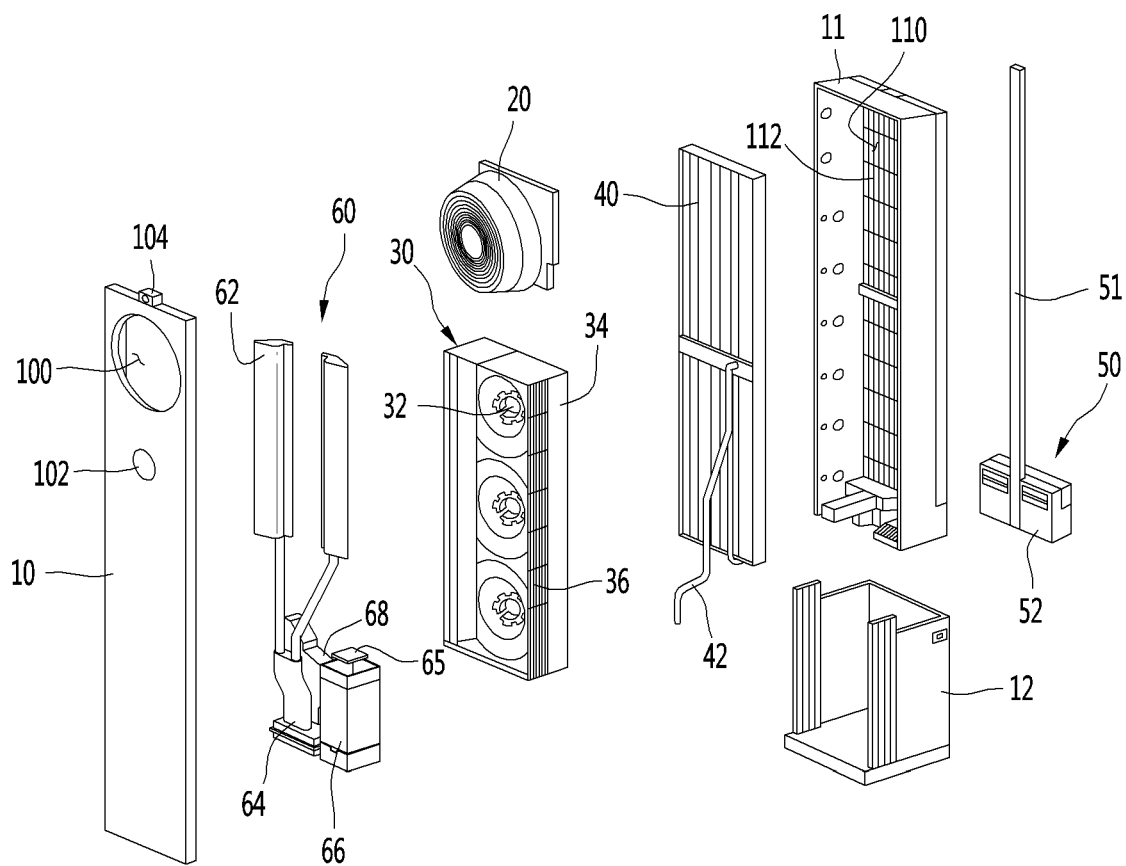
FIG. 2 is an exploded perspective view illustrating example components of the air conditioner.

FIG. 1 is a view illustrating an example of an air conditioner according to an implementation. FIG. 2 is an exploded perspective view illustrating example components of the air conditioner.

As illustrated in FIGS. 1 and 2, the air conditioner 1 may include a case including a plurality of cases 10, 11, and 12 that define an outer appearance thereof.

For example, the air conditioner 1 may correspond to an indoor unit of a stand-type air conditioner installed upright. However, this is provided for the illustrative purpose, and the present disclosure is not limited thereto. The air conditioner may include all devices that are able to clean, humidify, or cool and heat air in a predetermined space.

In some examples, the cases 10, 11, and 12 may have the shape of a box vertically extending. The cases 10, 11, and 12 may be divided into cabinets 11 and 12 and a door 10 detachably coupled to the cabinets 11 and 12.

The door 10 may define a front outer appearance of the air conditioner 1. In particular, the door 10 may be provided in the form of a rectangular plate extending vertically. The door 10 may be provided to be movable in left and right directions relative to the cabinets 11 and 12, and the details thereof will be described later.

The door 10 may define a first outlet 100 through which predetermined air is discharged. In some implementations, the first outlet 100 may be defined in an upper portion of the door 10 and may be provided in the form of a circular opening. In some cases, a first fan 20, which will be described later, may be disposed in the first outlet 100.

The door 10 may include an input unit 102 configured to receive a predetermined signal (e.g., user input). For example, the input unit 102 may be disposed at a position allowing a user to easily input information. In particular, the input unit 102 may be positioned under the first outlet 100. In some examples, the input unit 102 may include a touch panel configured to control operation of the air conditioner 1.

In some examples, the input unit 102 may include a sensor configured to sense predetermined pressure, touch, or the like. For example, when the user knocks the input unit 102 by a predetermined number of times, the door 10 may be open. The door 10 may be provided to be moved to one side when two knocks are input through the input unit 102. When three knocks are input into the input unit 102, the door 10 may be provided to be moved to an opposite side.

The door 10 may include a sensing unit 104 to sense or monitor a space where the air conditioner 1 is installed. The sensing unit 104 may be installed at an upper end of the door 10 to sense a wider space. For example, the sensing unit 104 may correspond to a camera installed to capture a surrounding image of the air conditioner 1, or a sensor to sense sound, motion, and the like.

The cabinets 11 and 12 may be coupled to the rear portion of the door 10. In some examples, the door 10 is movably coupled to the front surfaces of the cabinets 11 and 12. The cabinets 11 and 12 may be divided into an upper cabinet 11 and a lower cabinet 12 disposed vertically below the upper cabinet 11.

The upper cabinet 11 may be provided in the shape of a box having an open front surface. Accordingly, a predetermined installation space is formed in the upper cabinet 11, and an indoor heat exchanger 40, the first fan 20, and a fan assembly 30, which will be described later, may be installed in the installation space.

The upper cabinet 11 is formed therein with an inlet 110 into which predetermined air is introduced. Particularly, the inlet 110 is formed in the rear surface of the upper cabinet 11. The inlet 110 may have a filter assembly 112 installed therein to filter the air introduced through the inlet 110.

In some implementations, a cleaning assembly 50 is provided at one side of the filter assembly 112 to separate and collect foreign substances collected in the filter assembly 112. The cleaning assembly 50 includes a movement guide 51 extending up and down along the filter assembly 112 and a cleaning body 52 moving along the movement guide 51.

The cleaning body 52 may be moved along the movement guide 51 to clean the filter assembly 112 depending on a predetermined input or at predetermined time intervals. Accordingly, the user does not need to clean the filter assembly 112, or may clean the filter assembly 112 at a longer time interval. In other words, the convenience of the user may be greatly improved.

The lower cabinet 12 may be provided in the shape of a box having open front and top surfaces. Particularly, the lower cabinet 12 corresponds to a component installed on the floor to support the door 10 and the upper cabinet 11. In some implementations, the lower cabinet 12 may have a humidifying assembly 60 which is installed therein and to be described later.

The air conditioner 1 includes the first fan 20, the fan assembly 30, the indoor heat exchanger 40, and the humidifying assembly 60.

As described above, the first fan 20 may be positioned at a position corresponding to the first outlet 100 such that the first fan 20 is disposed in the first outlet 100. In some implementations, the first fan 20 is movable forward and backward. For instance, when the first fan 20 is operated, the first fan 20 may be moved forward and positioned at the first outlet 100. When the first fan 20 is not operated, the first fan 20 may be moved backward and positioned at the rear portion of the first outlet 100.

In this case, the first outlet 100 may have a cover (not illustrated) to open and close the first outlet 100. Accordingly, when the first fan 20 is not operated, the cover may close the first outlet 100. Therefore, the outer appearance of the air conditioner 1 becomes clean, and foreign matter or the like may be prevented from accumulating on the first fan 20.

The fan assembly 30 is disposed under the first fan 20. The fan assembly 30 includes a plurality of second fans 32 and a fan case 34 in which the plurality of second fans 32 are installed.

The second fans 32 may be stacked vertically and installed in the fan case 34. Although FIG. 2 illustrates three second fans 32 for the illustrative purpose, implementations are not limited thereto. The first fan 20 and the second fans 32 may be sequentially disposed in the vertical direction. For instance, the first fan 20 may be disposed vertically above the second fans 32.

The door 34 has a second outlet 36 to discharge predetermined air. The second outlet 36 is interposed between the door 10 and the upper cabinet 11 and the second outlet 36 may form an outer appearance of the air conditioner 1. Particularly, the second outlet 36 is positioned on both sides of the air conditioner 1. In some implementations, it may be understood that the second outlet 36 is formed in the case forming the outer appearance of the air conditioner 1.

The indoor heat exchanger 40 corresponds to a component to exchange heat between air introduced through the inlet 110 and the refrigerant. The indoor heat exchanger 40 may be connected to an outdoor unit having a compressor through a refrigerant pipe 42 to form one refrigerant cycle.

In some examples, the indoor heat exchanger 40 functions as an evaporator or a condenser and may exchange heat with indoor air. The indoor heat exchanger 40 may include a drain pan (not illustrated) to discharge or collect the condensate water produced in the heat exchange process.

The humidifying assembly 60 corresponds to component to humidify the air to be discharged. Particularly, the humidifying assembly 60 is provided to humidify the air discharged to the second outlet 36.

The humidifying assembly 60 includes a humidifying-supplying unit 62, a humidifying-producing unit 64, a humidifying-sterilizing unit 65, a humidifying-receiving unit 66, and a humidifying fan 68. In this case, the humidifying-producing unit 64, the humidifying-receiving unit 66, and the humidifying fan 68 are seated in the lower cabinet 12.

The humidifying-supplying unit 62 corresponds to a component to guide or discharge fine water particles to the second outlet 36. The humidifying-supplying unit 62 may extend from the humidifying-producing unit 64 to the second outlet 36. For example, the humidifying-supplying unit 62 may vertically extend corresponding to the second outlet 36.

In particular, two humidifying-supplying units 62 may be provided corresponding to the second outlets 36 formed on opposite sides. In some implementations, the humidifying-supplying unit 62 may include a pipe extending from the humidifying-producing unit 64 to the second outlet 36.

The humidifying-producing unit 64 corresponds to a component to heat water or to change water to fine water particles through ultrasonic vibration. For example, the humidifying-producing unit 64 may include a water heater configured to heat water to generate hot water vapor. In some examples, the humidifying-producing unit 64 may include an ultrasonic vaporizer that includes a ceramic diaphragm configured to vibrate at an ultrasonic frequency to generate water droplets or vapor. The humidifying-producing unit 64 is provided at one side thereof with the humidifying fan 68 to allow the fine water particles, which are produced from the humidifying-producing unit 64, to flow through the humidifying-supplying unit 62.

In some implementations, the humidifying-producing unit 64 may receive predetermined water through the humidifying-receiving unit 66. In other words, the humidifying-receiving unit 66 corresponds to a component to supply water for humidifying to the humidifying-producing unit 64.

The humidifying-sterilizing unit 65 corresponds to a component to sterilize the water contained in the humidifying-receiving unit 66. For example, the humidifying-sterilizing unit 65 may correspond to a light source that irradiates predetermined light to sterilize microorganisms present in the water. In some examples, the predetermined light may include an ultraviolet-C light emitting diode (UVC-LED).

The humidifying-receiving unit 66 will be described later in detail.

FIGS. 1 and 2 illustrate the configuration of the air conditioner 1 for the convenience of explanation, and the configuration of the air conditioner 1 is not limited thereto. Further, although the air conditioner capable of humidifying, purifying, and cooling/heating has been described, some functions may be omitted. For example, the air conditioner according to the present disclosure may also include a humidifying and purifying device capable of only performing a humidifying function and a purifying function.

Hereinafter, the operation of the air conditioner 1 will be described based on the above-described configuration.

Figure 3:
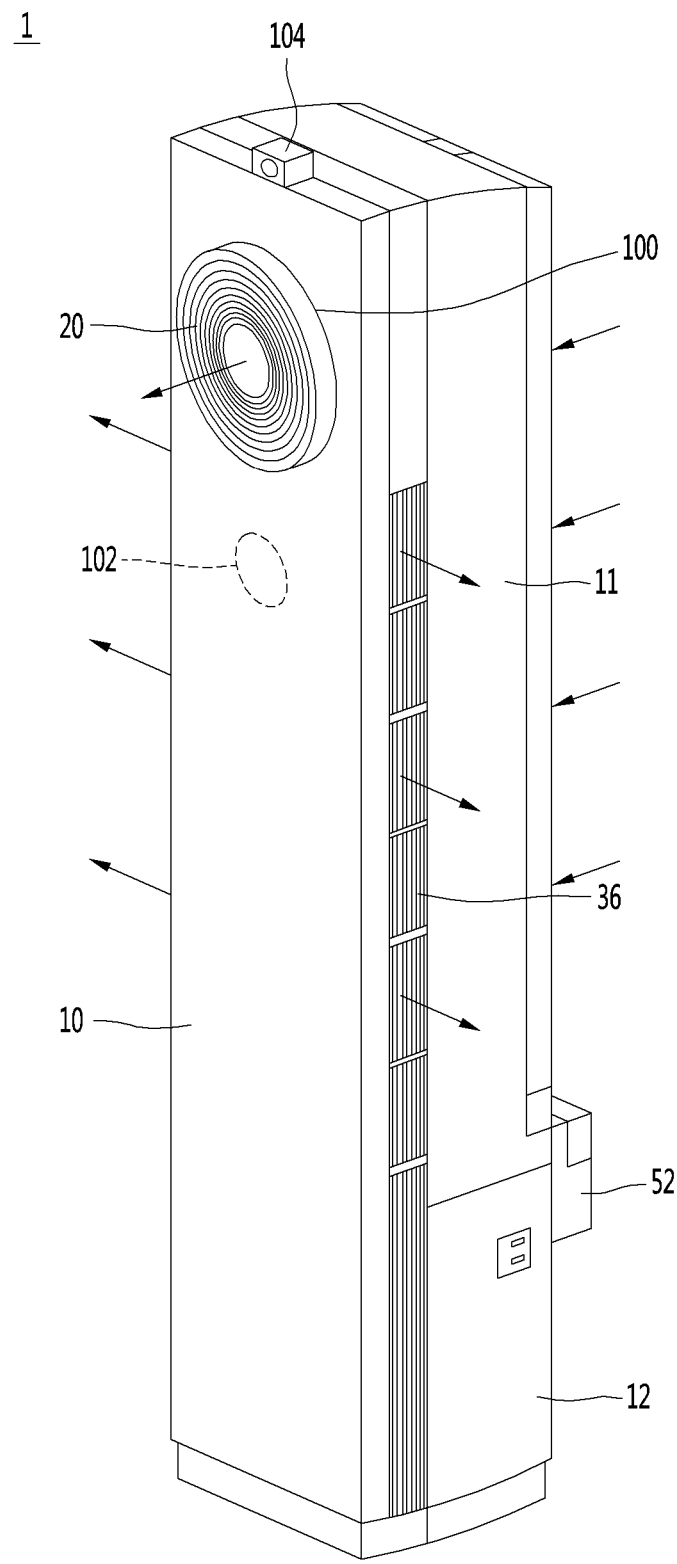
FIG. 3 is a view illustrating an example of air flow in the air conditioner.

FIG. 3 is a view illustrating the flow of air in an air conditioner.

As illustrated in FIG. 3, the air conditioner 1 includes one inlet 110 (see FIG. 2) and the plurality of outlets 100 and 36. In this case, the air outlets 100 and 36 may discharge air by driving mutually different fans.

In some examples, the air conditioner 1 includes the first outlet 100 positioned at the upper portion of the front surface of the air conditioner 1 and the second outlets 36 positioned at opposite sides of the air conditioner 1. In this case, air is discharged to the first outlet 100 by driving the first fan 20, and air is discharged to the second outlet 36 by driving the second fan 32.

In some implementations, the first fan 20 may change the direction of discharging the air to an up, down, left, right, or diagonal direction. In particular, the first fan 20 may provide direct air to the user and may provide the discharged air to a relatively far space. Accordingly, the first fan 20 may be referred to as a 'long-distance fan'.

In some implementations, the second fan 32 is disposed inside the cases 10, 11, and 12 to discharge air through the second outlet 36. Therefore, the second fan 32 may provide indirect fan to the user, and the second fan 32 may be referred to as a 'short-distance fan'.

Accordingly, the air conditioner 1 may be operated in a long-distance mode or a short-distance mode. For example, when a user wants direct wind or wants to rapidly cool and heat the relevant space, the air conditioner 1 operates in the long-distance mode. When the user wants to maintain the temperature of the relevant space to a current temperature, the air conditioner 1 operates in the sort-distance mode.

In some implementations, when the air conditioner 1 operates in the long-distance mode, the first fan 20 and the second fan 32 may operate. Accordingly, the air in the relevant space may be rapidly conditioned. The arrows illustrated in FIG. 3 indicates the case where the air conditioner 1 is operated in the remote mode. The air sucked from the rear surface of the air conditioner 1 is heat-exchanged and discharged through the front and side surfaces of the air conditioner 1.

In some implementations, the indoor heat exchanger 40 is not operated, and the air sucked from the rear surface of the air conditioner 1 is filtered and discharged through the front and side surfaces of the air conditioner 1.

Further, in the long-distance mode, only the first fan 20 may be operated as needed. In some implementations, when the air conditioner 1 operates in the short-distance mode, only the second fan 32 may be operated. Particularly, the first fan 20 may be moved backward, and the first outlet 100 may be closed by the cover.

Further, the air conditioner 1 may be operated in a humidifying mode. The humidified air may be discharged through the second outlet 36 as the humidifying assembly 60 is driven.

As described above, the air conditioner 1 may be operated in various modes, and may more effectively satisfy a demand of a user.

Figure 4:
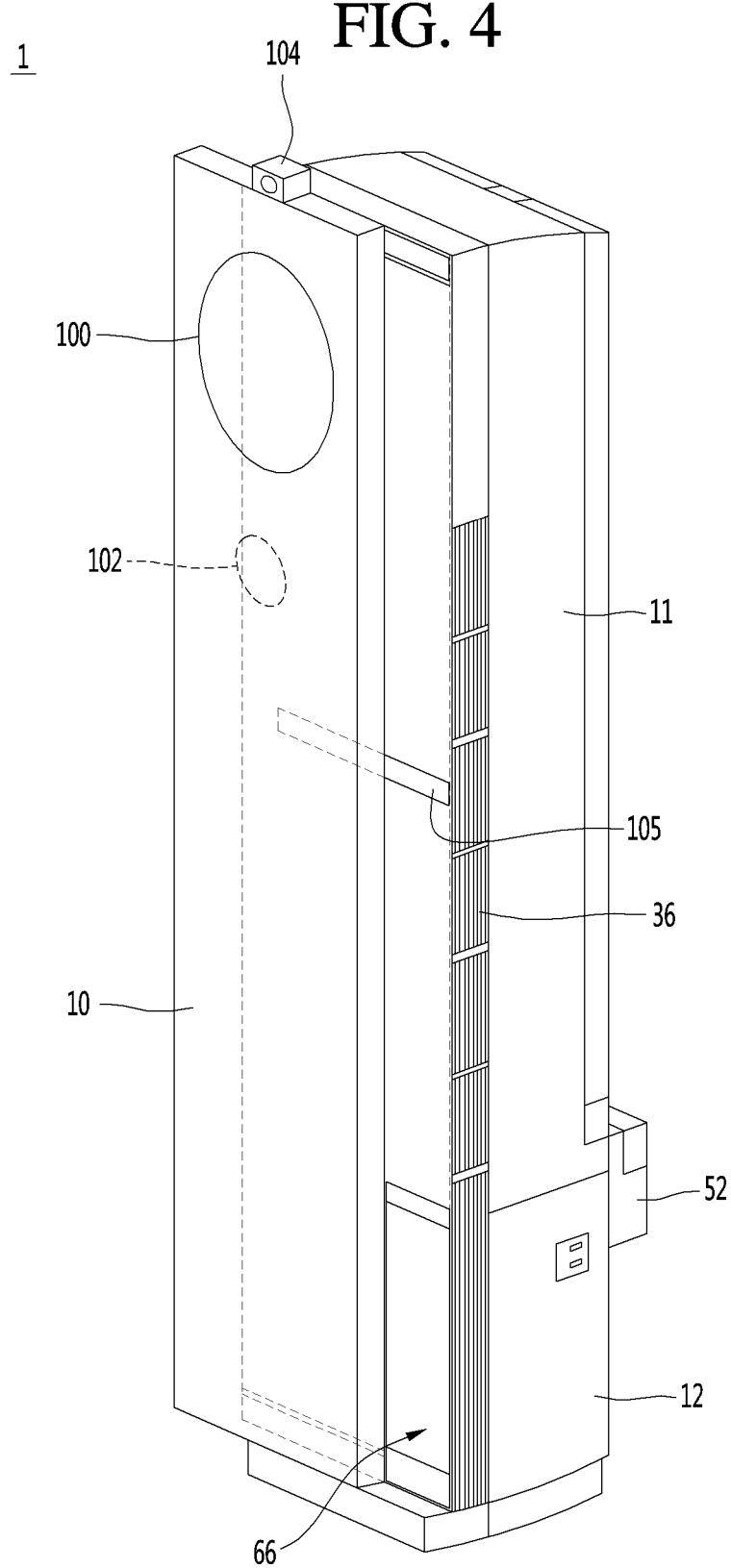
FIG. 4 is a view illustrating an example of movement of an example door of the air conditioner.
Figure 5:
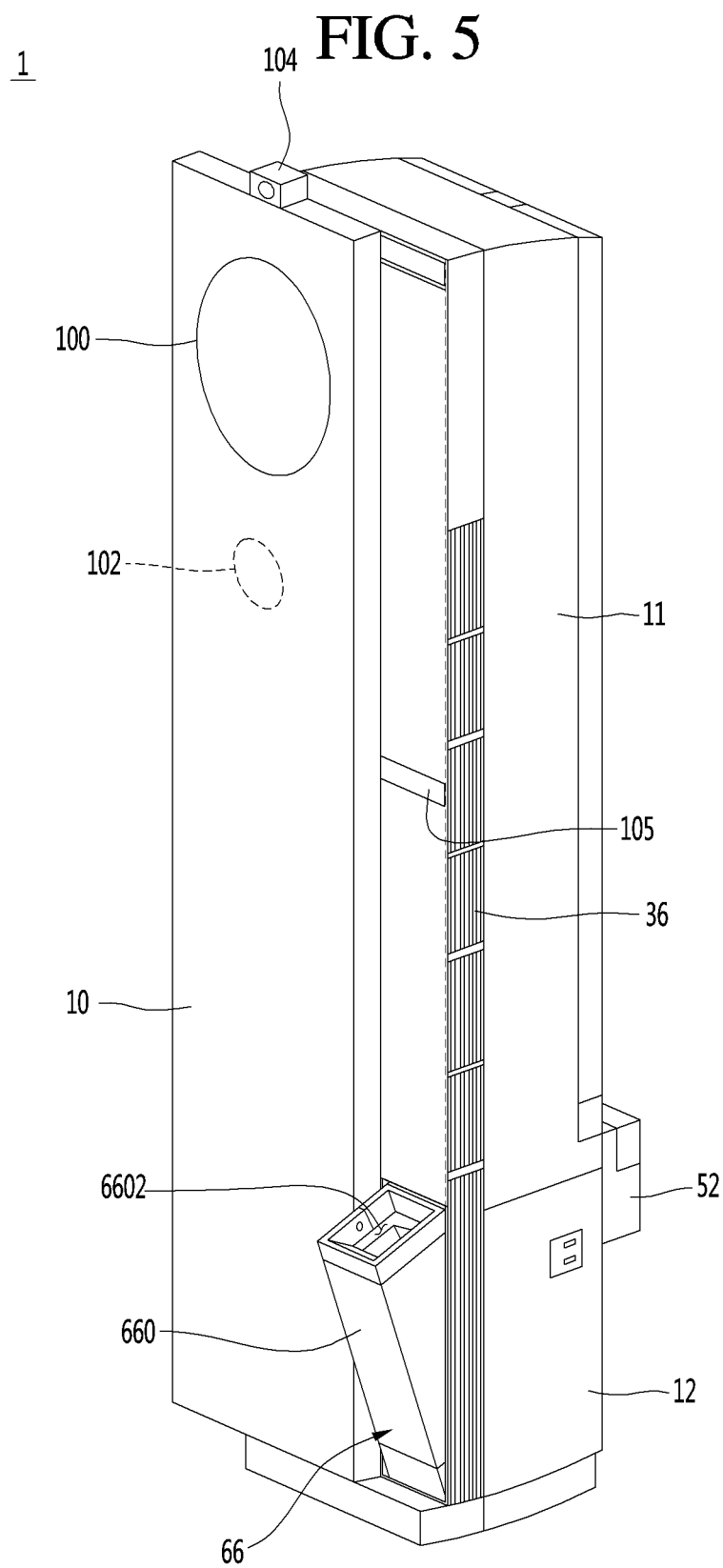
FIG. 5 is a view illustrating an example of movement of an example humidifying-receiving unit in the air conditioner.

FIG. 4 is a view illustrating movement of a door in an air conditioner. FIG. 5 is a view illustrating the movement of a humidifying-receiving unit in an air conditioner.

As illustrated in FIGS. 4 and 5, the door 10 may be moved to one side of the cabinets 11 and 12. In some examples, the door 10 may be slid in one direction. Particularly, the door 10 may be moved so the humidifying-receiving unit 66 may be exposed to the outside.

In some implementations, the air conditioner 1 includes a moving rail 105 extending in the left-right direction such that the door 10 may be slidably moved. The moving rail 105 may be provided in the cabinets 11 and 12 or may be provided on a separate panel. In some implementations, a plurality of moving rails 105 may be provided to be vertically spaced apart from each other.

Further, the door 10 may be moved along the moving rail 105 by using a rack and a pinion. Accordingly, as illustrated in FIG. 4, the humidifying-receiving unit 66 is exposed to the outside. In some implementations, the first fan 20 is provided in the state that the first fan 20 is moved rearward, thereby preventing the door 10 from being moved.

For example, when the user knocks the input unit 102, the pinion may be rotated, so the door 10 may be moved along the moving rail 105. The door 10 may be moved along the moving rail 105 when a specific motion or voice is sensed by the sensing unit 104.

Further, as illustrated in FIGS. 4 and 5, the humidifying-receiving unit 66 may be rotated forward and moved. In some examples, the humidifying-receiving unit 66 includes a water tank 660 in which predetermined water is received, and the water tank 660 is provided with an open top surface.

In this case, an opening formed in the upper surface of the water tank 660 is referred to as a water inlet 6602. The humidifying-receiving unit 66 may be rotated, so the water inlet 6602 is exposed forward. In other words, the humidifying-receiving unit 66 may be rotated, so water may be introduced through the water inlet 6602.

Further, the humidifying-receiving unit 66 may be rotated forward by using a rack and a pinion, for example. Accordingly, as illustrated in FIG. 5, the humidifying-receiving unit 66 and a portion of the humidifying-receiving unit 66 may be exposed to the outside based on rotation of the humidifying-receiving unit 66 relative to the cabinet 12. Further, the door 10 is provided in the state that the door 10 is moved to one side, thereby preventing the humidifying-receiving unit 66 from being moved.

In some implementations, when the door 10 is moved to one side, the humidifying-receiving unit 66 may be automatically rotated forward. In other words, when a predetermined signal is input through the input unit 102 or the sensing unit 104, the door 10 is moved to one side, and the humidifying-receiving unit 66 is rotated.

Therefore, the user may easily supply the water to the humidifying-receiving unit 66. For example, when the user holds water, which is to be supplied to the air conditioner 1, by a hand of the user, the water inlet 6602 may be exposed through a predetermined signal, thereby enhancing convenience.

Figure 6:
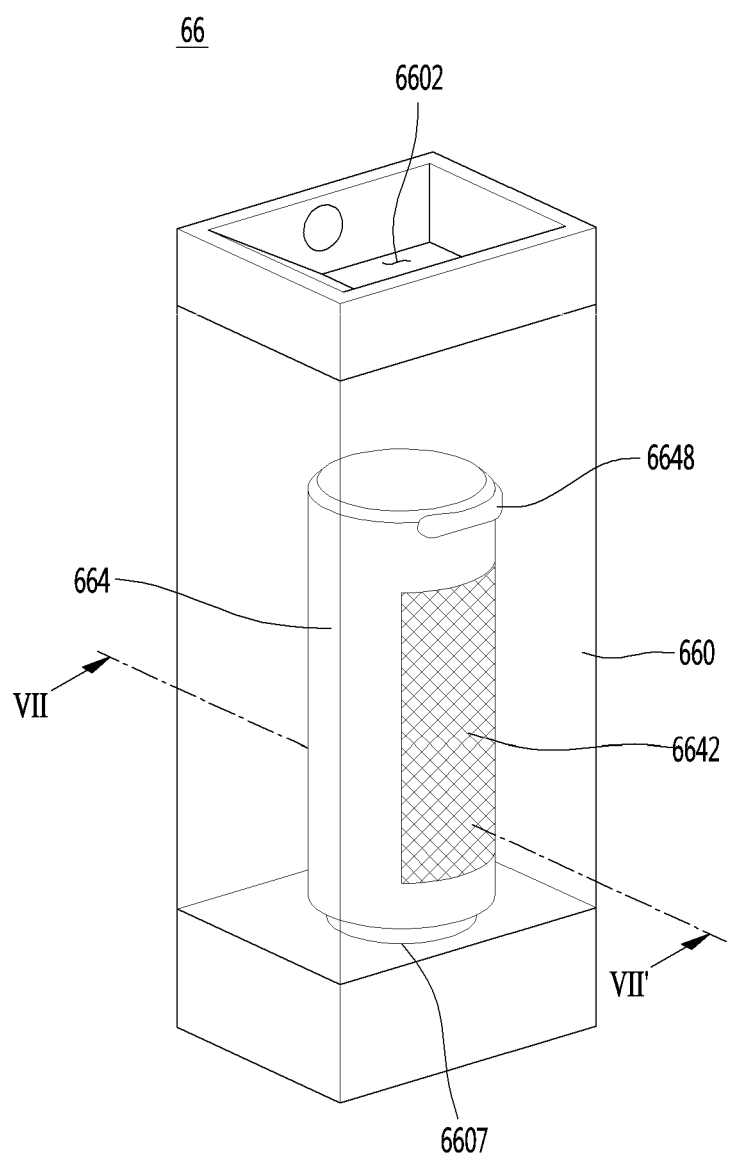
FIG. 6 is a view illustrating an example of a humidifying-receiving unit in the air conditioner.
Figure 7:
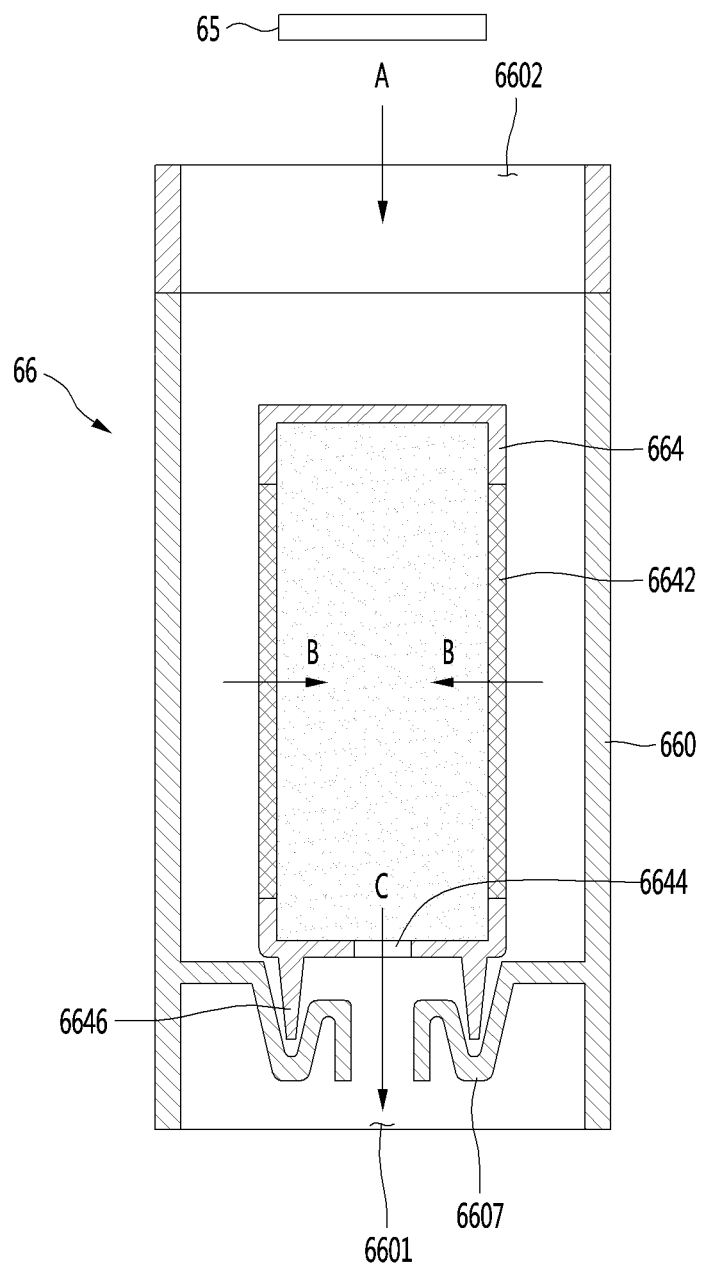
FIG. 7 illustrates a cross-sectional view taken along line VII-VII' of FIG. 6 and an example of a humidifying-sterilizing unit.

FIG. 6 is a view illustrating the humidifying-receiving unit in the air conditioner. FIG. 7 illustrates a cross-sectional view taken along line VII-VII' of FIG. 6 and a humidifying-sterilizing unit.

As illustrated in FIGS. 6 and 7, the humidifying-receiving unit 66 includes the water tank 660 in which predetermined water is received. As described above, the water tank 660 is provided with an open top shape. In particular, the water tank 660 may be provided in the shape of a box having an open top surface. However, this is provided for the illustrative purpose, and the water tank 660 may be provided in various shapes.

The water tank 660 has the water inlet 6602 into which water is introduced and a water outlet 6601 through which water is discharged. The water inlet 6602 corresponds to an opening through which water is supplied to the water tank 660 and the water outlet 6601 corresponds to an opening through which water flows into the humidifying-producing unit 64.

Referring to FIG. 7, the water inlet 6602 is formed in the top surface of the water tank 660, and the water outlet 6601 is formed in the bottom surface of the water tank 660. However, this is provided for the illustrative purpose. For example, the water inlet 6602 may be formed in the side surface of the upper portion of the water tank 660 or the water outlet 6601 may be formed in the side surface of the lower portion of the water tank 660.

The humidifying-receiving unit 66 includes a water filter for filtering the water introduced into the water inlet 6602. For example, the water filter may correspond to an ultra-pure water ion exchange resin. In some cases, the ultra-pure water ion exchange resin corresponds to a filter capable of removing at least 99% of hardness components in water.

The water filter may be disposed in a predetermined housing 664. As illustrated in FIG. 6, the housing 664 may have a cylindrical shape and may define an internal space configured to receive the water filter therein.

The housing 664 includes a first flowing port 6642 and a second flowing port 6644 formed to allow the flow of water. In some examples, the first flowing port 6642 corresponds to an opening allowing water contained in the water tank 660 to flow into the housing 664. The second flowing port 6644 corresponds to an opening allowing water contained in the housing 664 to flow into the water outlet 6601 from an inner part of the housing 664.

Referring to FIG. 7, the first flowing port 6642 is formed along the side surface of the housing 664. In some implementations, the second flowing port 6644 is formed in the bottom surface of the housing 664. In some implementations, a mesh network may be installed in the first flowing port 6642 to filter larger foreign substances.

In some implementations, the housing 664 is detachably installed in the water tank 660. For example, the water tank 660 includes a first mounting part 6607 on which the housing 664 is installed. The housing 664 is provided with a second mounting part 6646 corresponding to the first mounting part 6607. In some examples, the first mounting part 6607 may be a groove recessed from a bottom surface of the water tank 660, and the second mounting part 6646 may be a protrusion that protrudes from a bottom surface of the housing 664 toward the bottom surface of the water tank 660 and that is configured to be accommodated in the groove of the water tank 660.

The first mounting part 6607 may be integrally formed with the water tank 660 or may be separately manufactured and installed in the water tank 660. The first mounting part 6607 may be formed adjacent to the water outlet 6601 and communicate with the water outlet 6601.

The second mounting part 6646 may be integrally formed with the housing 664 or may be separately manufactured and installed in the housing 664. The second mounting part 6646 may be disposed on the bottom surface of the housing 664.

The first mounting part 6607 and the second mounting part 6646 are formed to be engaged with each other under pressure. In some examples, the first mounting part 6607 and the second mounting part 6646 may be formed in a concavo-convex structure corresponding to each other, and may be installed to be sealed and to be firmly fixed. In some implementations, water may be prevented from flowing between the first mounting part 6607 and the second mounting part 6646.

Accordingly, the first mounting part 6607 may be coupled to the second mounting part 6646 as the first mounting part 6607 is fitted into the second mounting part 6646. In other words, the housing 664 may be installed in the water tank 660 as the housing 664 is press-fitted into the water tank 660.

Further, the housing 664 includes a grip part 6648 which is rotatably provided. The grip part 6648 may be provided in a semicircular shape along the top surface of the housing 664. Therefore, when the grip part 6648 is not used, it may be seated in the housing 664.

In this case, the user may rotate the grip part 6648 upward to lift the housing 664 upward. Accordingly, the housing 664 may be separated from the water tank 660. In particular, the user may separate the housing 664 from the water tank 660 and replace the housing 664 with new one in the state illustrated in FIG. 5.

Hereinafter, the flow of water in the humidifying-receiving unit 66 will be described with reference to FIG. 7. First, water may be supplied through the water inlet 6602, which is called a first flow "A". When the first flow "A" occurs, the humidifying-receiving unit 66 may be disposed such that the water inlet 6602 is exposed to the outside as illustrated in FIG. 5.

In some implementations, the water inlet 6602 may be formed in an upper portion of the front surface of the water tank 660. In this case, even when the humidifying-receiving unit 66 is not rotated, the first flow "A" may occur.

The water flowing in the first flow A corresponds to the water supplied by the user. The water supplied in such a manner is received in the water tank 660. The water contained in the water tank 660 flows into the housing 664. In more detail, water flows into the housing 664 through the first flowing port 6642, which is referred to as a second flow "B".

In this case, the first flowing port 6642 is formed in the lower side of the housing 664 along the side surface of the housing 664. Accordingly, even when a smaller amount of water is received in the water tank 660, a second flow "B" may occur through the first flowing port 6642.

Water flowing in the second flow "B" corresponds to water output through the first flowing port 662. The water may correspond to water obtained by removing larger foreign substances from the water supplied by the user.

In some implementations, the water flows into the humidifying-producing unit 64 from the humidifying-receiving unit 66. In some examples, the water is discharged from the housing 664 through the second flowing port 6644 and flows into the humidifying-producing unit 64 through the water outlet 6601, which is referred to as a third flow "C".

The water flowing in the third flow C corresponds to purified water output through the water filter. The purified water may be supplied to the humidifying-producing unit 64 to be changed into fine water particles and may be sprayed into the air through the humidifying-supplying unit 62.

Further, as illustrated in FIG. 7, the humidifying-sterilizing unit 65 is located above the humidifying-receiving unit 66. In some examples, the humidifying-sterilizing unit 65 is positioned above the water inlet 6602 such that predetermined light is irradiated to the water received in the water tank 660. This corresponds to the case where the humidifying-receiving unit 66 is arranged as illustrated in FIG. 4.

In this case, the humidifying-sterilizing unit 65 may be driven or stopped depending on an amount of water received in the water tank 660, that is, a remaining amount of water. In other words, the sterilizing duration by the humidifying-sterilizing unit 65 may be determined by the remaining amount of water.

Figure 8:
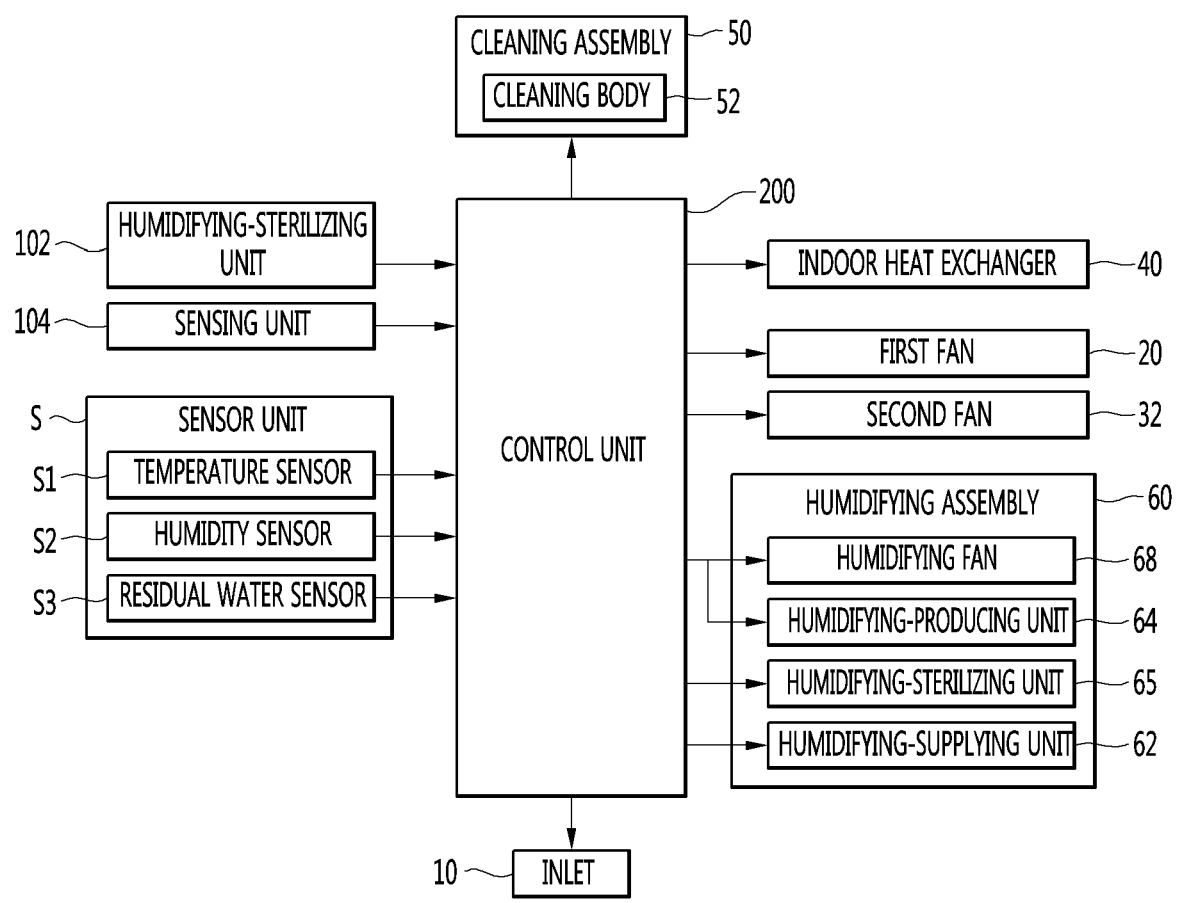
FIG. 8 is a view illustrating an example of control components of an example air conditioner.

FIG. 8 is a view illustrating a control component in an air conditioner.

As illustrated in FIG. 8, the air conditioner 1 includes a control unit 200 that controls the above-described components.

The control unit 200 may receive a user command through the input unit 102 or information through the sensing unit 104. In some implementations, the control unit 200 may receive information from a sensor unit S that senses various pieces of information. The sensing unit 104 may be understood as a kind of the sensor unit S.

The sensor unit S may include various sensors, and may include a temperature sensor S1, a humidity sensor S2, and a residual water sensor S3. Such a sensor may be provided for the illustrative purpose, may be omitted, and may be added. The temperature sensor S1 and the humidity sensor S2 may be understood as sensors for measuring the temperature and humidity of the space in which the air conditioner 1 is installed.

The residual water sensor S3 corresponds to a sensor to measure the amount of water, that is, the remaining amount of water received in the water tank 660. In some examples, the residual water sensor S3 may include a distance detecting sensor to measure the distance from the surface of the water received in the water tank 660. In this case, the residual water sensor S3 may be positioned above the water inlet 6602 together with the humidifying-sterilizing unit 65.

The control unit 200 may measure the remaining amount of water by comparing the distance measured by the residual water sensor S3 with previously stored data on the remaining amount of water. For example, the remaining amount of water may be determined by comparing a currently measured distance with the distance measured by the residual water sensor S3 when water is received to the maximum in the water tank 660, that is, the water is fully contained in the water tank 660.

The air conditioner 1 may be operated in various air conditioning modes to condition the air in the installation space.

The air conditioner 1 may be operated in a cooling mode or a heating mode for adjusting the temperature of the installation space. For example, when the temperature desired by the user is input by the input unit 102, the temperature of the installation space measured by the temperature sensor S1 is compared to operate in the cooling mode or the heating mode.

In the cooling mode or the heating mode, the control unit 200 may drive the indoor heat exchanger 40, the first fan 20, or the second fan 32. In this case, that driving the indoor heat exchanger 40 may be understood as driving the compressor to flow the refrigerant.

Further, as described above, the first fan 20 and the second fan 32 may be driven together or separately as needed. In some implementations, the first fan 20 may change the direction of discharging the air to an up, down, left, right, or diagonal direction.

The air conditioner 1 may be operated in a dehumidifying mode or a humidifying mode for adjusting the humidity of the installation space. For example, when the humidity desired by the user is input by the input unit 102, the temperature of the installation space measured by the temperature sensor S2 is compared to operate in the dehumidifying mode or a humidifying mode.

In this case, the dehumidifying mode may be operated in the same manner as the cooling mode or the heating mode. A separate dehumidifying assembly may be provided in the air conditioner 1.

In the humidifying mode, the control unit 200 may drive the humidifying assembly 60. In some examples, the humidified air may be discharged by driving the humidifying fan 68 and the humidifying-producing unit 64. In particular, the second fan 32 may be driven together, and the humidified air may be provided to the second outlet 36.

The cooling mode or the heating mode and the dehumidifying mode or the humidifying mode may be simultaneously operated. For example, the air conditioner 1 may be operated in a heating-humidifying mode, a cooling-dehumidifying mode, or the like.

In some implementations, the air conditioner 1 may be driven in a ventilation mode or a purifying mode such that the installation space is ventilated or purified without the change of the temperature and the humidity. In this case, the first fan 20 or the second fan 32 may be driven.

In some implementations, the air conditioner 1 may be operated in various management modes for the components.

The air conditioner may be operated in a cleaning mode for separating and collecting foreign matters collected in the filter assembly 112. For example, the air conditioner 1 may be operated in the cleaning mode after operating in the air conditioning mode as described above.

In the humidifying mode, the control unit 200 may drive the cleaning body 52. The cleaning body 52 may be moved along the movement guide 51 to clean the filter assembly 112.

Further, the air conditioner 1 may be operated in a water supply mode in which predetermined water is supplied to the humidifying-supplying unit 62. For example, when the remaining amount of water measured by the residual water sensor S3 is less than a predetermined amount, the operation may be performed in the water supply mode.

In the water supply mode, the control unit 200 may move the door 10 and the humidifying-supplying unit 62. In some examples, as described with reference FIGS. 4 and 5, the door 10 may be moved to one side and the humidifying-supplying unit 62 may be rotated forward.

Further, the air conditioner 1 may be operated in a sterilizing mode for sterilizing water in the humidifying-supplying unit 62. For example, the air conditioner 1 may be operated in the sterilizing mode at predetermined time intervals or after operated in the humidifying mode. In some implementations, the air conditioner 1 may include an additional sensor to measure the state of water, which is received in the humidifying-supplying unit 62, for example, an amount of microorganisms.

In the sterilizing mode, the control unit 200 may drive the humidifying-sterilizing unit 65. In particular, the control unit 200 drives the humidifying-sterilizing unit 65 during a sterilizing duration determined depending on the remaining water amount measured by the residual water sensor S3. Hereinafter, the sterilizing mode will be described in detail through a control flowchart.

Figure 9:
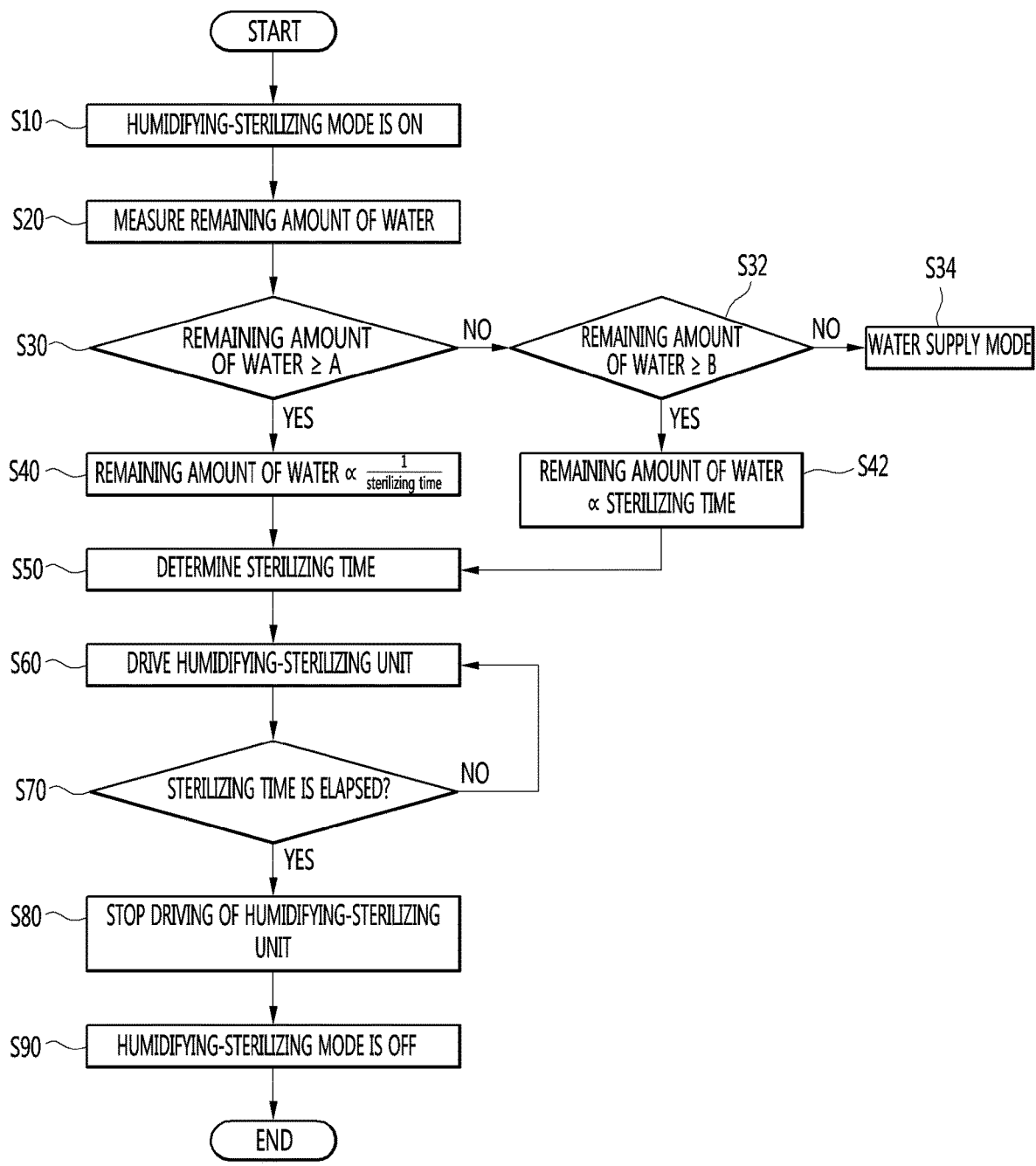
FIG. 9 is a view illustrating an example of a control flow in a sterilizing mode of the air conditioner.

FIG. 9 is a view illustrating the control flow in the sterilizing mode in the air conditioner.

As illustrated in FIG. 9, the sterilizing mode is turned on (S10). The turning on of the sterilizing mode may be understood as that the air conditioner 1 is operated in the sterilizing mode. As described above, the sterilizing mode may be turned on based on various preset conditions.

When the sterilizing mode is turned on, the remaining amount of water is measured (S20). For example, an amount of water contained in the humidifying-receiving unit 66, in detail, an amount of water contained in the water tank 660 is measured. Such a remaining amount of water may be measured by the residual water sensor S3 and based on previously stored data.

Then, it is determined whether the remaining amount of water is equal to or greater than a first value A (S30). As described above, the humidifying-sterilizing unit 65 is disposed above the humidifying-supplying unit 62. Accordingly, when the remaining amount of water is reduced, the distance between the humidifying-sterilizing unit 65 and the water is increased. In other words, the distance between the light irradiated by the humidifying-sterilizing unit 65 and the contained water is increased.

In some cases, when the remaining amount of water is reduced, the sterilization efficiency may be reduced. In other words, when the remaining amount of water is reduced, the sterilizing duration may be increased to obtain the same sterilization effect. Therefore, the remaining amount of water is inversely proportional to the sterilizing duration.

In some cases, when a smaller amount of water is sterilized, the same sterilizing effect may be produced even in the small amount of water. In other words, the sterilizing effect may be understood as being increased. For instance, when the remaining amount of water is reduced, the sterilizing duration for the same sterilization effect may be reduced. Therefore, the remaining amount of water is proportional to the sterilizing duration.

Accordingly, the remaining amount of water may be inversely proportional to or proportional to the sterilizing duration depending on factors of an influence on sterilization. According to the air conditioner 1, when the remaining amount of water is equal to or greater than the first reference value A, the remaining amount of water is inversely proportional to the sterilizing duration (S40). In some implementations, when the remaining amount of water is equal to or greater than the first reference value A, the influence by the distance between water and the light source is more increased than an influence by the remaining amount of water.

When the remaining amount of water is less than the first reference value A, the remaining amount of water is proportional to the sterilizing duration (S42). In other words, when the remaining amount of water is less than the first reference value A, the influence by an amount of water is more increased rather than the distance from the light source. The first reference value A may be set differently depending on the size of the water tank and the position of the humidifying-sterilizing unit 65. Such a first reference value A may be calculated through experiments.

In some implementations, the first reference value A may correspond to a remaining amount of water requiring a longest sterilizing duration. For example, when the remaining amount of water is greater than the first reference value A, the sterilizing duration is reduced since the remaining amount of water is inversely proportional to the sterilizing duration. In another, when the remaining amount of water is less than the first reference value A, the sterilizing duration is reduced since the remaining amount of water is proportional to the sterilizing duration.

When the remaining amount of water is less than the second value B (S32), the water supply mode is turned on (S34). In this case, the second reference value B is a reference value serving as a reference value for operation in the water supply mode, and may be set differently according to implementations. The second reference value B may be understood as a minimum remaining amount of water for driving the humidifying assembly 60 or a minimum remaining amount of water that can be sterilized by the humidifying-sterilizing unit 65. The second reference value B may be less than the first reference value A.

In summary, when the remaining amount of water is equal to or greater than the first reference value A, the remaining amount of water is inversely proportional to the sterilizing duration, and when the remaining amount of water is equal to or greater than the second reference value B and is less than the first reference value A, the remaining amount of water is proportional to the sterilizing duration. When the remaining amount of water is less than the second value B, the operation is performed in the water supply mode.

The sterilizing duration is determined as described above (S50), and the humidifying-sterilizing unit 65 is driven (S60). In other words, it is determined whether the sterilizing duration has elapsed (S70), and the driving of the humidifying-sterilizing unit 65 is stopped. Then, the sterilizing mode is turned off (S90). Hereinafter, the sterilizing mode will be described together with exemplary reference values set for convenience of understanding.

FIG. 10 is a graph illustrating the relationship between a remaining amount of time and the sterilizing duration in the air conditioner.

As illustrated in FIG. 10, the times taken to sterilize 99% of microorganisms (hereinafter referred to as sterilizing duration) are different from each other depending on the remaining amount of water. For instance, the sterilizing duration may be about 60 minutes when the remaining amount of water is 2.75 L, and the sterilizing duration may be about 70 minutes when the remaining amount of water is 1.4 L. The sterilizing duration may be about 90 minutes when the remaining amount of water is 0.7 L, and the sterilizing duration may be about 80 minutes when the remaining amount of water is 0.3 L.

In this case, when the remaining amount of water is 2.75 L, water is fully filled in the water tank, and when the remaining amount of water is 0.3 L, water in the water tank is insufficient. In other words, 0.3 L may be understood as a value corresponding to the second reference value B described above. In some implementations, when the remaining amount of water is 0.7 L, the longest sterilizing duration is required. In other words, 0.7 L may be understood as a value corresponding to the first reference value A described above.

As described above, as the remaining amount of water is reduced from 2.57 L to 1.4 L, the sterilizing duration is increased. In other words, the distance from the humidifying-sterilizing unit 65 has a greater influence on the sterilization efficiency when the amount of water is from 2.75 L to 0.7 L.

It may be recognized that the sterilizing duration is decreased as the remaining amount of water is decreased from 0.7 L to 0.3 L. In other words, when the remaining amount of water is from 0.7 L to 0.3 L, an amount of water exerts a greater influence on the sterilization efficiency rather than the distance from the humidifying-sterilizing unit 65.

Accordingly, when the remaining amount of water is 2.75 L, the humidifying-sterilizing unit 65 is driven for 60 minutes and stopped, and when the remaining water amount is 1.4 L, the humidifying-sterilizing unit 65 is driven for 70 minutes and stopped. When the remaining amount of water is between 2.75 L and 1.4 L, the humidifying-sterilizing unit 65 may be driven for 70 minutes. In some implementations, the humidifying-sterilizing unit 65 may be driven for time between 60 minutes and 70 minutes.

As described above, the air conditioner 1 may set sterilizing durations differently depending on the remaining amount of water. Accordingly, the sterilizing duration may be efficiently determined, the lifespan of the humidifying-sterilizing unit 65 may extend, and the convenience of the user may be increased.

What is claimed is:

1. An air conditioner comprising:
   a case that defines an inlet and an outlet;
   a fan configured to generate air flow from the inlet to the outlet;
   a filter assembly disposed inside the case and configured to allow air introduced through the inlet to pass therethrough;
   a humidifying assembly disposed inside the case and configured to humidify filtered air to be discharged through the outlet, the humidifying assembly comprising:
      a humidifying-receiving unit comprising a water tank configured to receive water,
      a humidifying-producing unit configured to generate water vapor from water supplied from the humidifying-receiving unit,
      a humidifying-supplying unit configured to receive the water vapor produced from the humidifying-producing unit and supply the water vapor to the outlet, and
      a humidifying-sterilizing unit configured to irradiate light to water received in the water tank; and
   a control unit configured to control the fan and the humidifying assembly,
   wherein the control unit is configured to:
      based on a remaining amount of water in the water tank, control a driving time of the humidifying-sterilizing unit corresponding to a sterilizing duration for water in the water tank,
      based on the remaining amount of water being greater than or equal to a first reference value that is preset, determine the sterilizing duration to be inversely proportional to the remaining amount of water; and
      based on the remaining amount of water being less than the first reference value, determine the sterilizing duration to be proportional to the remaining amount of water.

2. The air conditioner of claim 1, wherein the first reference value corresponds to an amount of water corresponding to a maximum sterilizing duration.

3. The air conditioner of claim 1, wherein the control unit is configured to:
   determine the remaining amount of water based on an irradiation distance between the humidifying-sterilizing unit and water in the water tank; and
   based on the remaining amount of water being greater than or equal to the first reference value, increase the sterilizing duration in response to a decrease of the remaining amount of water.

4. The air conditioner of claim 1, wherein the control unit is configured to:
   based on the remaining amount of water being less than the first reference value, decrease the sterilizing duration in response to a decrease of the remaining amount of water in the water tank.

5. The air conditioner of claim 1, wherein the control unit is configured to stop driving of the humidifying-sterilizing unit based on the remaining amount of water being less than the first reference value and a second reference value that is preset.

6. The air conditioner of claim 1, further comprising:
   a residual water sensor configured to measure the remaining amount of water, wherein the humidifying-sterilizing unit and the residual water sensor are positioned at an upper portion of the water tank.

7. The air conditioner of claim 6, wherein the water tank defines a water inlet at a top surface of the water tank,
wherein the humidifying-receiving unit is configured to be rotatably installed inside the case and to rotate relative to the case to thereby expose the water inlet to an outside of the case, and
wherein the humidifying-sterilizing unit and the residual water sensor are positioned at an upper portion of the water inlet in a state in which the humidifying-receiving unit is installed inside the case.

8. The air conditioner of claim 7, wherein the case comprises:
a cabinet; and
a door movably coupled to a front surface of the cabinet and configured to move to one side of the cabinet to thereby expose the humidifying-receiving unit to the outside of the case, and
wherein the humidifying-receiving unit is configured to, based on the door moving to the one side of the cabinet, rotate from an inside of the cabinet to the front surface of the cabinet to thereby expose the water inlet to the outside of the case.

9. The air conditioner of claim 8, wherein the control unit is configured to, based on the remaining amount of water being less than a second reference value that is preset, control the humidifying-receiving unit to rotate relative to the case to thereby expose the water inlet to the outside of the case.

10. The air conditioner of claim 8, wherein the door is configured to move to another side of the cabinet to thereby cover the humidifying-receiving unit based on the humidifying-receiving unit rotating from the front surface of the cabinet to the inside of the cabinet.

11. The air conditioner of claim 1, wherein the outlet comprises:
a first outlet defined at a front surface of the case; and
a second outlet defined at a side surface of the case, and
wherein the humidifying-supplying unit is configured to supply the water vapor to the second outlet.

12. The air conditioner of claim 11, wherein the fan comprises:
a first fan configured to blow air to the first outlet; and
a second fan configured to blow air to the second outlet, and
wherein the first fan and the second fan are arranged along a vertical direction in the case.

13. The air conditioner of claim 12, wherein the control unit is configured to generate air flow from the inlet to at least one of the first outlet or the second outlet by operating at least one of the first fan or the second fan.

14. The air conditioner of claim 12, wherein the control unit is configured to, based on operating both of the second fan and the humidifying-producing unit, discharge the water vapor produced from the humidifying-producing unit through the second outlet.

15. The air conditioner of claim 1, wherein the humidifying-receiving unit comprises:
a housing that is detachably installed inside the water tank; and
a water filter received in the housing.

16. The air conditioner of claim 15, wherein the housing defines:
a first flowing port that faces an inner surface of the water tank and that is configured to introduce water in the water tank to the water filter; and
a second flowing port that faces a bottom surface of the water tank and that is configured to discharge water passing through the water filter.

17. The air conditioner of claim 16, wherein the water tank defines a water outlet that is disposed at the bottom surface of the water tank and that is configured to receive water discharged through the second flowing port.

18. The air conditioner of claim 15, wherein the water tank defines a groove recessed from a bottom surface of the water tank, and
wherein the housing comprises a protrusion that protrudes from a bottom surface of the housing toward the bottom surface of the water tank and that is configured to be accommodated in the groove of the water tank.

19. The air conditioner of claim 1, wherein the case comprises:
an upper cabinet that receives the filter assembly and that defines the inlet;
a lower cabinet that is disposed vertically below the upper cabinet and that receives the humidifying assembly; and
a door disposed forward of the upper cabinet and the lower cabinet and configured to cover front surfaces of the upper cabinet and the lower cabinet.

20. An air conditioner comprising:
a case that defines an inlet and an outlet;
a fan configured to generate air flow from the inlet to the outlet;
a filter assembly disposed inside the case and configured to allow air introduced through the inlet to pass therethrough;
a humidifying assembly disposed inside the case and configured to humidify filtered air to be discharged through the outlet, the humidifying assembly comprising:
a humidifying-receiving unit comprising a water tank configured to receive water,
a humidifying-producing unit configured to generate water vapor from water supplied from the humidifying-receiving unit,
a humidifying-supplying unit configured to receive the water vapor produced from the humidifying-producing unit and supply the water vapor to the outlet, and
a humidifying-sterilizing unit configured to irradiate light to water received in the water tank;
a residual water sensor configured to measure a remaining amount of water, wherein the humidifying-sterilizing unit and the residual water sensor are positioned at an upper portion of the water tank; and
a control unit configured to control the fan and the humidifying assembly,
wherein the control unit is configured to, based on the remaining amount of water in the water tank, control a driving time of the humidifying-sterilizing unit corresponding to a sterilizing duration for water in the water tank.

* * * * *